United States Patent [19]

Mizutani et al.

[11] Patent Number: 5,272,121

[45] Date of Patent: Dec. 21, 1993

[54] SIC SINTERED BODY

[75] Inventors: Toshiaki Mizutani; Akihiko Tsuge, both of Yokohama, Japan

[73] Assignee: Kabushiki Kaisha Toshiba, Kawasaki, Japan

[21] Appl. No.: 838,923

[22] Filed: Feb. 21, 1992

[30] Foreign Application Priority Data

Feb. 22, 1991 [JP] Japan ................................. 3-28358

[51] Int. Cl.$^5$ ............................................. C04B 35/56
[52] U.S. Cl. ......................................... 501/90; 501/88
[58] Field of Search ................................. 501/88, 90

[56] References Cited

U.S. PATENT DOCUMENTS

| 4,105,455 | 8/1978 | Koga et al. | 501/90 |
| 4,853,299 | 8/1989 | Mizutani et al. | 428/698 |

FOREIGN PATENT DOCUMENTS

| 0327046 | 8/1989 | European Pat. Off. . |
| 3630369 | 3/1987 | Fed. Rep. of Germany . |
| 2109810 | 3/1982 | United Kingdom . |

Primary Examiner—Mark L. Bell
Assistant Examiner—Deborah Jones
Attorney, Agent, or Firm—Oblon, Spivak, McClelland, Maier & Neustadt

[57] ABSTRACT

A SiC ceramic sintered body containing 0.05-5 atom % Sc, 10 atom % or less free carbon, 2 atom % or less oxygen, balance SiC, is described where 75% or more of the Sc is dissolved into the SiC grains.

7 Claims, No Drawings

SIC SINTERED BODY

BACKGROUND OF THE INVENTION

1. Field of the Invention

The present invention relates to a SiC sintered body.

2. Discussion of the Background

Pressureless sintering is a preferred method for manufacturing a SiC sintered body having a complicated shape, not only because this method is simple and inexpensive, but because a sintered body having a shape closer to that desired can be obtained, requiring less processing to finish the product as compared to the hot-press sintering method. In pressureless sintering, various types of sintering aids are used to enhance the atomic diffusion of elements.

An example of such a sintering aid is carbon. When carbon is used any oxide film (SiO$_2$) formed is reduced and eliminated as formulated below:

$$SiO_2 + 3C \rightarrow SiC + 2CO \uparrow$$

At the same time, the carbon aid also makes the SiC sintered body dense. This is because Si vacancies are formed in the SiC fine crystals when carbon is added, and these vacancies serve to promote Si atom diffusion, which is usually relatively low, up to the level of that of carbon.

However, the lattice diffusion promoting effect which can be obtained by adding the carbon is not enough to achieve the desired densification of a SiC sintered body. In order to further enhance lattice diffusion, boron (B), aluminum (Al), or a rare earth element can be used in addition to carbon. For example, use of B-C family aids is set forth in Published Unexamined Japanese Patent Application (PUJPA) No. 51-148712 and PUJPA No. 52-6716. Further, PUJPA Nos. 54-118411 and 57-160970 disclose use of Al-C and rare earth-C family auxiliaries, respectively. These auxiliaries help to prepare a dense sintered body using the pressureless sintering method, and from this dense sintered body a complicated-shaped SiC sintered body can be easily obtained. In addition, the sintering process in the above-mentioned case is a solid phase sintering, which does not produce a liquid phase; therefore the fast fracture strength of the sintered body does not deteriorate until the temperature reaches 1500° C. where, for example, an Al-C family aid is used. Consequently, a SiC sintered body produced by this sintering method can be used as a high-temperature-structural part in a gas turbine.

Such a gas turbine, however, is required to be driven at a temperature higher than 1500° C. in order to improve its energy efficiency. The properties of the above-mentioned conventional SiC sintered body is not yet good enough to meet such requirements.

More specifically, if a SiC sintered body prepared through the use of a B-C, Al-C, or rare earth-C family auxiliary is employed as a high temperature structural material, e.g. in a gas turbine, under high temperature conditions over 1500° C., the life of the sintered body is shortened due to deterioration of the mechanical properties thereof, caused by high temperature corrosive oxidation.

In consideration of the above problem, a SiC sintered body which is mechanically strong at temperatures over 1500° C. and has excellent high temperature corrosive oxidation resistance is needed.

SUMMARY OF THE INVENTION

The object of the invention is to provide a SiC sintered body which can overcome the above-mentioned problems, especially by providing mechanical strength at high temperatures and resistance against high temperature oxidation corrosion.

In order to achieve this object, the inventors conducted intensive research on SiC sintered bodies prepared through the use of rare earth-C family auxiliaries, and have discovered that excellent, dense sintered bodies can be obtained when a scandium (Sc)-C aid pair, which is not specifically disclosed in PUJPA No. 57-160970, is used. Further, as the inventors proceeded in their research towards the improvement of high temperature corrosive oxidation resistance, they also discovered that the high-temperature-oxidation corrosion resistance of SiC can be enhanced by controlling the amounts of free carbon and oxygen contained in a SiC sintered body. The present invention has been achieved based on these discoveries.

Thus, the objective of the invention is achieved by a SiC sintered body consisting essentially of:

0.05 atom %-5 atom % of scandium;
10 atom % or less of free carbon;
2 atom % or less of oxygen; and
the balance of SiC;

wherein most of said scandium is dissolved, as solid solution, into the SiC portion to prevent deterioration of the high-temperature corrosive oxidation resistance, caused by oxidization of the scandium present in a grain boundary of the sintered body.

In the present invention, scandium (Sc) is added as a sintering aid to improve the density of the product. It should be noted that if the Sc content in the sintered body is less than 0.05 atom %, sufficient density of the sintered product can not be obtained. Consequently, it is essential in the present invention that the Sc content always be set to 0.05 atom % or more. On the other hand, if the Sc concentration in the sintered body exceeds a certain point, the density begins to decrease, and this point, i.e. the upper limit of the Sc concentration, is 5 atom %. However, the Sc content should preferably be 1 atom % or less for the following reason.

An SiC sintered body, if exposed to the atmosphere at high temperature over a long period of time, is naturally oxidized in accordance with the following formula.

$$SiC + 3/2\, O_2 \rightarrow SiO_2 + CO \uparrow$$

Due to this oxidation, a film of cristobalite SiO$_2$ (melting point: 1713° C.) is formed on the surface of the sintered body. The rate of growth of this SiO$_2$ film depends on the diffusion rate of oxygen in the SiO$_2$ film. This relationship is expressed as:

$$d = A \times t^{0.5}$$

where d, t, and A represent the thickness of the SiO$_2$ film, time, and a constant, respectively.

The above equation indicates that the oxidation rate is reduced along with the time. This is because the SiO$_2$ film protects the surface of the SiC material from being oxidized. Due to such protection, the strength deterioration with time of the sintered body is avoided; therefore the presence of the SiO$_2$ film is very important.

Here, it should be also pointed out that if an SiC sintered body containing Sc is exposed to a hot atmosphere for a long time, the Sc atoms diffuse out to the surface of the body, forming an oxide, $Sc_2O_3$ (melting point: 2405° C.). This $Sc_2O_3$ further reacts with the $SiO_2$ film to form a glassy phase, $SiO_2$—$Sc_2O_3$ (eutectic point: 1660° C.), and is liquefied. Consequently, suppression of oxygen diffusion in the cristobalite $SiO_2$ film is relieved, accelerating the oxidizing reaction. As a result, the high temperature oxidation resistance of the sintered body is deteriorated. Therefore, the Sc content in the SiC sintered body should be as small as possible, preferably, 1 atom % or less as mentioned.

Further, in the present invention, most, preferably all, of the scandium should be dissolved into the SiC to prevent formation of the oxide, $Sc_2O_3$, which causes deterioration of the high temperature oxidation resistance of the sintered body. In other words, if scandium is not dissolved in the SiC grains, and precipitates as particles in the grain boundary, the scandium is easily oxidized to form $Sc_2O_3$. Therefore, 75%, preferably 95%, or more, of the scandium content should be dissolved in the SiC grains.

In the meantime, it is required in the invention that the free carbon content in the SiC sintered-body be limited to 10 atom % or less, for the following reason.

That is, some of the carbon added as a sintering aid along with Sc, inevitably remains behind as free carbons. In detail, a part of the SiC decomposes at a sintering temperature, and volatilizes in the forms of Si-rich silicon carbide species such as $Si_2C$ and $Si_3C$, leaving free carbons behind. A part of the free carbon remains on the surface of the sintered body. The rest of the free carbons are unevenly distributed throughout the sintered body, between SiC crystals, and can cause deterioration of mechanical properties. Therefore, such free carbon should be decreased. More specifically, if the amount of the free carbon exceeds 10 atom %, a dense sintered body can no longer be obtained. It is necessary that the amount is no more than 10 atom % to prepare a dense sintered body.

Further, these free carbons, in an oxidation resistance test, are used as a source of collective CO gas, and destroy the cristobalite protection film, enhancing the oxidation of the SiC surface. If the sintered body is held in a high temperature atmosphere for a long time, the free carbons react with the scandium in the solid solution to form ScC (melting point: 1800° C.), exhibiting the creeping property. Also, to prevent such inconvenience, the free carbon content should be limited to no more than 5 atom %.

It is also necessary in the invention that the oxygen content of the SiC sintered body be limited to no more than 10 atom %, for the following reason.

That is, there is always some oxygen derived from SiC material powder and sintering auxiliary powder, as an inevitable impurity. If the amount of this oxygen impurity exceeds the saturation point where oxygen impurity is no longer dissolved, and starts to precipitate, oxides such as $SiO_2$ (melting point: 1717° C.) and $Sc_2O_3$ (melting point: 2405° C.) are formed in the grain boundary of the SiC. These oxide products may further transform into a composite having a relatively low melting point, such as a glass phase Of $SiO_2$—$Sc_2O_3$ (eutectic point: 1660° C.). Since such a composite softens at a high temperature near 1600° C., the possibility of fracture of the sintered body, caused by a grain boundary fracture mode, gradually increases. At the same time, ceramic fatigue caused by crack growth starts to appear so obviously that if the weight loading speed is reduced from 0.5 mm/min (fast fracture strength measurement) down to 0.0005 mm/min (fatigue strength measurement), deterioration of the strength obviously appears. To prevent such a problem, it is necessary to reduce the oxygen impurity amount in the SiC sintered body to the soluble limit where no more oxygen is dissolved into the SiC, that is, about 2 atom % or less, most preferably 0.2 atom %.

Although it is not an absolute requirement, it is preferable in the invention that the nitrogen content in the SiC sintered body is no more than 5 atom %. Actually, the optimum nitrogen content (atom %) for the present invention is no more than 5 atom % and no less than a half of the oxygen content (atom %). The following is the reason therefor.

Scandium is generally added in the form of ScN or ScC. In the case of ScN, some of nitrogen is lost out of the reaction system, but the remaining nitrogen is inevitably dissolved into the SiC along with scandium. The amount of nitrogen remaining in the sintered body is, roughly speaking, no more than the scandium content (atom %). If the amount of ScN added is very small, for example, in the case of the scandium content of 0.1 atom % or less, the nitrogen content may be higher than that of scandium due to the nitrogen mixed into the SiC material powder. If the nitrogen content increases to the point where the nitrogen oxides cannot be dissolved into the SiC any more, and appears in an undissolved form in the SiC, $Si_3N_4$ (decomposing point: 1850° C.) or the like, which easily decomposes at high temperature, is formed. This $Si_3N_4$ deteriorates densification of the sintered body; and therefor should be avoided. To prevent the deterioration of the density, the nitrogen content in the sintered body should preferably be 5 atom % or less.

On the other hand, the nitrogen dissolved into SiC during the sintering process works favorably in the invention. That is, the dissolved nitrogen precipitates in the grain boundary if held for a long period of time at high temperature. This precipitating nitrogen serves to transform the glass phase of $SiO_2$—$Sc_2C_3$ eutectic point: 1660° C.) into an $SiO_2$—ScN, and therefore raises the melting point of the sintered body. For this advantage, it is most preferable that the nitrogen content (atom %) is no less than half of the oxygen content (atom %).

Of the impurities other than mentioned above, metal impurities such as Fe, Ca, Al, and B work to decrease the high-temperature strength and heat resistance of the sintered body. Consequently, these impurities should be present in as small an amount as possible, more specifically, 0.5 atom % or less in total, and 0.25 atom % or less, individually.

The crystal state of a SiC sintered body according to the present invention is as follows:

Giant crystal grains, which may be formed in the sintered body due to unusual grain growth, can initiate fracture and decrease the instantaneous fracture strength. The influence of such giant crystal grains is more prominent when the shape thereof are plate-like or grainy than when it is needlelike, and, in fact, such an influence can be somewhat negligible in the case of needle-like giant grains. In consideration of this influence, the SiC sintered body of the invention should be of the finest polycrystal structure as far as possible. The preferable fine polycrystal structure consists of grains having an aspect ratio (long axis/short axis) of 5 or less, and a maximum size of 50 μm or less. A more preferable structure consists of grains having an aspect ratio of 3 or less, and maximum a size of 50 μm or less.

A method of preparing a SiC sintered body according to the present invention will now be described in detail.

An α-SiC of the non-cubic crystal system, β-SIC of the cubic crystal system, or a mixture of these can be used as SiC powder, the initiating material. It is preferable that the SiC powder is fine power which has a specific surface area of 10 mm$^2$/g or more, and is of high crystalline particles. It is also important that the SiC powder contain as little impurities, e.g. free Si, free SiO$_2$, free carbon, Ca, Fe, as possible.

The amount of scandium added as a sintering aid is very small. Therefore, scandium is added in the form of a fine powder such as non-crystalline Sc, ScC, ScN, Sc$_2$O$_3$, or may be added in a form of liquid such as a solution of a soluble Sc organic compound. In either case, Sc should be uniformly dispersed. In reality, ScC, Sc$_2$C, Sc$_4$C$_3$, Sc$_2$C$_3$, or ScN powders—note that these do not contain oxygen—are recommended since they are easier to handle as the sintering auxiliary material. It should be noted that it is preferable to use those having an average grain size of 5 μm or less. To reduce the amount of scandium added as far as possible, which is essential for densifying the sintered product, the uniform-dispersing methods of using a scandium-containing liquid, and fine powder of grain size of no more than 0.5 μm are effective.

Further, carbon, which is also a sintering aid, can be used in a form of fine powder of non-crystalline carbon. Alternatively, the liquidous resins of the phenol series, which produce free carbons when decomposed by heating at about 1000° C. or less in an inert atmosphere, can be used. In either case, carbons should be fully uniformly dispersed. This carbon sintering aid covers the surface of each material powder which is the source of the main component SiC and auxiliary scandium, during temperature elevation up to 1400° C. during the sintering. The carbon sintering aid which covers the surface of the material powder causes the reduction reaction of oxide films, e.g. SiO$_2$ and Sc$_2$O$_3$, which are present in the surface region and obstacles to densification of the product. This carbon aid cleans up the surface region by a reduction reaction, and then is discharged in the form of CO gas and the like. The optimum amount of the carbon aid having the above-mentioned function is in the range between 0.75 and 3.0 times (in weight) of the oxygen contained in the main component of the mixture raw composition. Meanwhile, the free carbons (about 10 atom %-1 atom %) remaining behind after the reduction suppress growth of abnormal particles of the SiC powder, and help to form Si vacancies by dissolving into SiC crystals, raising the diffusion coefficient of Si to the level of that of carbon. These two functions of the remaining free carbons contribute to improvement of the density of the sintered body.

Preparation of the raw material is carried out by mixing, for a long period of time using a wet- or dry-type bowl mill. In the case where ScN (specific gravity: 4.47 g/cc) is used as the scandium source, it preferably prepared as a high concentration slurry since there is a significant difference in specific gravity between ScN and the main material, SiC (specific gravity: 3.17 g/cc). Mass-preparation through drying—and making grains can be conducted by spray-drying.

Some of the molding methods employed in the invention are casting from slurry, extrusion, and injection. Simply shaped bodies can be formed by a metal mold casting of spray dried powder, or by CIP (cold isostatic pressing) mold. In the case where a binder, which improves the formability of a body, is used, all that is required is to mix and dissolve an appropriate amount of the binding substance, e.g. ethylene glycol, paraffin or appropriate resin, into the slurry in advance.

Then, the molded body obtained in the above process is heated mildly up to 700°-900° C. in an inert gas atmosphere. Thus, the resin portion such as the binder is decomposed to be released and removed (degreasing step). Thereafter, the degreased material thus obtained is sintered. In the sintering step, a molded body to be sintered is put in a carbon or SiC container in advance, and the container is set in a vacuum sintering furnace having a carbon heater. It should be noted that the sintering conditions, e.g. the temperature increase rate during heating, depends on the size of the sintering furnace, the performance of the vacuum pump, the occupancy of the sample and the like, and therefore the conditions vary from one situation to another. Consequently, the most appropriate conditions should be selected depending on an actual situation.

During sintering, SiO$_2$, Sc$_2$O$_3$ and the like are completely reduced by the carbon sintering auxiliary to obtain a product with satisfactory density. The complete reduction can be achieved by heating the molded body for a predetermined time at a reducing temperature (for example, 1200°-1500° C.), and finally further heating at a sintering temperature. Since the degree of vacuum in the furnace initially decreases due to the gas generated during the reduction reaction, and recovers after a while, the completion of the reduction reaction can be easily detected by observing the degree of vacuum in the furnace during heating.

In the final stage of sintering, the sintered body is held in a vacuum or inert gas atmosphere of 1800°-2400° C. for 1-3 hours, to achieve the desired density. The inert gas atmosphere serves more or less to suppress decomposition of SiC at the sintering temperature. Consequently, it is preferable that the final stage carried out for densifying the product be conducted in an inert gas atmosphere, for which Ar, He or Ne gas at atmospheric pressure are generally used. The density and the degree of fineness of the structure, which can be obtained by the densification step of 1800°-2400° C., may vary somewhat from one sintered body to another depending on the timing of the introduction into the Ar gas furnace where the holding temperature is changed up and down two or three times along with time, and on the degreased-body volume occupied in the carbon container. Therefore, the densification program at 1800°-2400° C. of each individual sintering furnace should be checked for the optimum conditions.

After completion of the above-described high temperature holding stage, the resultant should be cooled as quickly as possible. If the cooling step is carried out too gradually over several days, the distortion stress created in SiC matrixes is relaxed, decreasing the accumulation of the distortion stress, which is necessary. As a result, it is likely that the fracture toughness of the product is deteriorated. To avoid such a problem, the resultant should be cooled down to at least about 1500° C. within one hour.

The sintered resultant, which was densified by the non-pressure sintering method, is then treated in an Ar HIP (hot isostatic pressing) process at about 2000° C.–0.1 GPa, for further densification. The SiC sintered body of the invention is thus obtained.

Alternatively, the SiC sintered body according to the invention can be obtained by the hot press method. In the case where the hot press is carried out in an Ar gas atmosphere at 2000° C., an almost-100%-dense sintered body, the density of which is 2% higher than that by the non-pressure sintered body, is obtained. The sintered body thus obtained exhibits substantially the same characteristics at room temperature and high temperature; for example, the mechanical properties, and the resistance against oxidation corrosion at high temperature, as those of a sintered body obtained by the pressureless sintering method.

As described above, according to the present invention, there is provided a SiC sintered body which is mechanically strong at both room temperature and temperature as high as about 1600° C., and which exhibits excellent fatigue property and oxidation corrosion resistance both at high temperature. In addition, the SiC sintered body of the invention can be produced by the nonpressure sintering method. Therefore, the SiC sintered body of the invention is highly valuable as a material for complicatedly-shaped structural parts used at high temperature at the latest technology level.

The present invention will now be further explained in detail by way of examples.

EXAMPLE 1

About 5.52 g of ScN powder (average grain diameter: 1.0 μm, oxygen content: 2.1 wt %), equivalent to 2.0 mol %, was added to 160.4 g of commercially available α-SiC powder having the specific surface of 15 m$^2$/g (produced by LONZA Co., UF-15, average grain diameter: 0.8 μm, oxygen content: 1.28 wt %). Then, 8.27 g novolak resin (carbon residue amount: about 4.88 g) was added to the above mixture as a carbon source. The amount of carbon added here is equivalent to about 2.25 times (in weight) of oxygen contained in the prepared mixture. This blended compound was dispersed in the solution made of 20 cc of diethylene glycol (binder) and 200 cc of acetone (dispersing solvent), and the resultant slurry was blended in a pot mill for 72 hours. After that, the slurry was dried by volatilizing the acetone content thereof, and granulated by means of a 60-mesh screen. The obtained grains were metal-molded into a plate having the size of 33 mm×43 mm×6 mm, and the plate was pressed at 3 tons/cm$^2$ by CIP (rubber press). The molded body obtained was buried in B$_4$C powder for degreasing, and slowly heated up to 800° C. in a nitrogen gas atmosphere over half a day for decomposing the binder and novolak resin, which were eventually discharged.

Further, the degreased resultant was heated up to about 1000° C. in a vacuum sintering furnace, and the temperature is raised at the rate of 250° C./h to 1300° C. While the temperature was maintained at the same, the degree of vacuum once decreased due to the gas discharge, and then recovered after a while. Upon detecting this phenomenon, the temperature is raised at the rate of 125° C./h up to 1450° C. The decrease in the degree of vacuum indicates that carbon monoxide is discharged in the furnace due to reduction of SiO$_2$ and Sc$_2$O$_3$ contained in the degreased resultant by carbon, and the recovery thereof signifies completion of the reduction reaction.

Then, Ar gas was introduced into the furnace, and the temperature was raised at the rate of 1000° C./h up to 2000° C. under atmospheric pressure, maintaining the temperature for 2 hours. Thus, a sintered body having the density of 3.12 g/cc was obtained. The density actually achieved here was 97% of the theoretical value of the sintered body. Since an amount of scandium added as a sintering aid was little, divergence from the theoretical density of the pure SiC was very small.

A microchemical analysis was conducted for the obtained sintered body, and found that it contains Sc of 1 atom %, N of 0.4 atom %, free carbon of 1 atom %, 0 of 0.1 atom %, and other metal impurities, Fe and Ca in total of 0.05 atom %. An X-ray diffraction measurement was also conducted, and found no diffraction peak except for SiC. The analysis also indicated that about 70 vol % of SiC is in the 4H phase, and the rest is either in the 6H or 15H phase.

The above sintered body was mirror-polished and etched by an NaOH/KOH solution at 400° C. The etched surface was observed by a scanning electronic microscope for examination of micro-structure. In this observation, no abnormal grains growth was not found. The basic unit of the micro-structure was a grain having an aspect ratio of 3 at highest, and an average grain diameter of about 3 μm.

Next, a test piece (3 mm×4 mm×33 mm) which meets the JIS standard is cut out from the sintered body for examining the strength of the product. The examination was actually carried out to find out the resistance of the piece against three-point bending. The results were as follows:

At room temperature: 61 kg/mm$^2$
At 1600° C.: 68 kg/mm$^2$
At room temperature after an oxidization test in the static air atmosphere of 1500° C.–100H: 60 kg/mm$^2$ A similar examination was also carried out using the same test piece of the JIS standard except for that the cross head speed was reduced from 0.5 mm/min to 0.0005 mm/min. The results were as listed below, and as is clear from the results, there was no sign of fatigue not only at room temperature, but also high temperature.

At room temperature: 61 kg/mm$^2$
1600° C.: 68 kg/mm$^2$

The fracture toughness value calculated from the measured value by the indentation microfracture method, and the empirical formula of Niihara et al., was about 3 MPa.m$^{\frac{1}{2}}$.

An increase in weight in the oxidization test under the static air atmosphere pressure at 1600° C.–100H, was as small as 0.5 mg/cm$^2$, proving the sintered body exhibits a sufficient oxidation resistance at high temperature.

EXAMPLES 2–14 AND COMPARATIVE EXAMPLES 1–4

In all of Examples 2–14, sintered bodies were prepared by basically the same procedure as that of Example 1, except for changes in the amount of ScN powder added, the average diameter, and the amount of carbon added in Examples 2–11, use of ScC as a source of the scandium aid in Example 12, employment of the hot press sintering method in Example 13, and, the HIP process carried out after the pressureless sintering in Example 14. The sintered bodies obtained from these Examples were examined for their characteristics in the same manner as Example 1.

In the meantime, sintered bodies were produced in Comparative Examples 1–4, which are basically the same as Example 1, except for changes in the amount of ScN powder added, the average diameter, and the amount of carbon added. These sintered bodies were also subjected to the same characteristic test as that of the Example 1.

The table 1 below summarizes the results obtained from the Examples 1-14, and Comparative Examples 1-4. In the table 1, each items are defined as follows:

<Sc content>: the amount of scandium contained in the sintered body obtained, in the unit of atom %.

<Sc average grain diameter>: the average grain diameter of the Sc-source material powder.

<f-C content>: the amount of free carbon contained in the sintered body in the unit of atom %.

<C adding amount>: the ratio of the amount in weight of carbon added as a sintering aid against that of oxygen contained in the original mixture taken as 1.

<N content and 0 content>: the amount of each element contained in the sintered body in the unit of atom %.

<$\rho$>: the density of the sintered body.

<$\sigma^{0.5}$f RT>: the fast fracture strength at room temperature (cross head speed: 0.5 mm/min)

<$\sigma^{0.5}$f 1600>: the fast fracture strength at 1600° C. (cross head speed: 0.5 mm/min).

<$\sigma^{0.0005}$f 1600>: the fracture strength at 1600° C. (cross head speed: 0.0005 mm/min).

<$\Delta W^{100}$1600>: the increase in weight after the oxidization test in the static air, measured in a similar manner as in the Example 1 (holding for 100 hour at 1600° C.). 2 <$K^{RT}$IC>: the fracture toughness of the piece, measured in a similar manner as in the Example 1.

temperature atmospheric pressure, indicating that they are fully resistive to high-temperature oxidation.

In Examples 1, 4, 5, 6, 7, and 10, the amounts of scandium, free carbon, and oxygen, contained in the sintered body are substantially ideal, and actually, the measured values in these examples are especially excellent. On the other hand, in Examples 2, 3, 8, 9, and 11, there are somewhat excessive amounts of scandium, free carbon, and oxygen. As a result, the qualities of the sintered bodies are somewhat lower than the other in terms of high-temperature oxidation resistance, and fatigue of high-temperature strength, although they are fully applicable to regular usage.

In Example 12, ScC powder was used as a source of the scandium aid. The results of this example indicate that fully satisfactory characteristics can be obtained from the material in which the nitrogen remaining amount is extremely reduced.

Example 13 is the case where the hot press sintering method is employed for densification of the product in place of the non-pressure sintering. The results of this example show that the hot press sintering method further increases the density of the product having the same compositions as those of the case of the pressureless sintering, and fully satisfactory characteristics can be obtained thereby. However, this method is not advantageous for making parts having complicated shapes since the sintered body produced by this method has larger portions to be scraped out in the later processing step.

In Example 14, the sintered body obtained in the Example 4 was further densified by the HIP (heat iso-

TABLE 1

|  | element content | | | | | | | instantaneous breakage strength | | | weight increase upon oxidation | toughness | |
|---|---|---|---|---|---|---|---|---|---|---|---|---|---|
|  | Sc | | | | | | | | | | | | |
|  | content/ atom % | average grain diameter/ atom % | f-C content/ atom % | C addition amount | N content/ atom % | O content/ atom % | density $\rho$/ %TD | $\rho^{0.5}$ fRT/ kg/mm² | $\rho^{0.5}$ f 1600/ kg/mm² | $\rho^{0.0005}$ f 1600/ kg/mm² | $\Delta W^{100}$ 1600/ mg/cm² | $K^{RT}$ IC/ GP2 $\sqrt{R}$ | note |
| Example 1 | 1 | 1.0 | 1 | 2.25 | 0.4 | 1.4 | 97 | 61 | 68 | 68 | 0.5 | 3 | |
| Example 2 | 4 | 2.1 | 5 | 2.25 | 3.6 | 0.3 | 92 | 50 | 52 | 51 | 1 | 4 | |
| Example 3 | 2 | 2.1 | 5 | 2.25 | 1.8 | 0.3 | 95 | 56 | 61 | 62 | 0.9 | 4 | |
| Example 4 | 1 | 2.1 | 4 | 2.25 | 0.9 | 0.3 | 96 | 60 | 67 | 64 | 0.6 | 3 | |
| Example 5 | 0.5 | 1.0 | 4 | 2.25 | 0.45 | 0.3 | 97 | 62 | 70 | 68 | 0.5 | 3 | |
| Example 6 | 0.1 | 0.1 | 4 | 2.25 | 0.10 | 0.3 | 95 | 63 | 73 | 71 | 0.6 | 3 | |
| Example 7 | 0.05 | 0.1 | 5 | 2.25 | 0.06 | 0.3 | 94 | 61 | 68 | 68 | 0.7 | 3 | |
| Example 8 | 1 | 0.5 | 8 | 3.0 | 0.7 | 0.2 | 96 | 62 | 63 | 62 | 1.5 | 4 | |
| Example 9 | 1 | 0.5 | 6 | 2.2 | 0.9 | 0.2 | 97 | 62 | 71 | 73 | 0.8 | 4 | |
| Example 10 | 1 | 0.5 | 5 | 2.0 | 0.9 | 0.3 | 96 | 63 | 74 | 75 | 0.4 | 3 | |
| Example 11 | 1 | 0.5 | 3 | 1.5 | 0.9 | 1.0 | 95 | 64 | 62 | 55 | 0.3 | 4 | |
| Example 12 | 1 | 0.5 | 5 | 2.25 | 0.02 | 0.4 | 96 | 60 | 66 | 65 | 0.2 | 3 | * |
| Example 13 | 1 | 0.5 | 5 | 2.25 | 1.0 | 0.4 | 99 | 64 | 67 | 66 | 0.6 | 5 | ** |
| Example 14 | 1 | 1.0 | 3 | 2.25 | 0.8 | 0.2 | 99 | 74 | 80 | 80 | 0.1 | 4 | *** |
| Comparatial Example 1 | 8 | 2.1 | 6 | 2.25 | 7.5 | 0.3 | 80 | 19 | 18 | 19 | 10 | — | |
| Comparatial Example 2 | 0.02 | 0.1 | 6 | 2.25 | 0.03 | 0.3 | 75 | 9 | 12 | 13 | 20 | — | |
| Comparatial Example 3 | 1 | 0.5 | 12 | 5.0 | 0.6 | 0.1 | 91 | 36 | 37 | 36 | 5 | — | |
| Comparatial Example 4 | 1 | 0.1 | 0.5 | 0.2 | 0.9 | 5.0 | 91 | 54 | 46 | 28 | 0.3 | 5 | |

* Use of ScC powder as scardiwm aid source
** employment of hot press method during sintering
*** HIP processing of sintered body obtained in Example 4

As is clear from the table 1, all of the sintered bodies prepared in the Examples of the present invention exhibit excellent fast fracture strengths of 50 kg/mm² or more, and densities of 90% or more. These sintered bodies also exhibit low increases in weight of no more than 1.5 mg/cm² after the oxidization tests at the high static pressing) process of about 2000° C.-0.1 Gpa Ar, and the best characteristics among all the examples can be obtained.

In contrast, in Comparative Example 1, an excessive amount of ScN is added. As a result, the product has unsatisfactory density (density: 85%), poor fast fracture strength, and resistance to high-temperature oxidation.

In Comparative Example 2, an insufficient amount of the scandium aid source is added. As a result, this product too has unsatisfactory density (density: 85%), poor fast fracture strength, and resistance to high-temperature oxidation.

In Comparative Example 3, an excessive amount of the carbon aid source is added, generating too many carbon residue. As a result, the product has unsatisfactory density (density: 75%), poor fast fracture strength, and resistance to high-temperature oxidation.

In Comparative Example 1, an insufficient amount of carbon is added, resulting in producing a large amount of oxygen remainder (5.0 atom %) in the sintered body. As a result, the product has satisfactory density: 85%), but so poor fast fracture strength, and distance to high-temperature oxidation that the product is not applicable to actual use.

Additional advantages and modifications will readily occur to those skilled in the art. Therefore, the invention in its broader aspects is not limited to the specific details, representative materials, and illustrated examples shown and described herein. Accordingly, various modifications may be made without departing from the spirit or scope of the general inventive concept as defined by the appended claims and their equivalents.

What is claimed is:

1. A SiC sintered body consisting essentially of:
   0.05 atom %–5 atom % of scandium;
   10 atom % or less of free carbon;
   2 atom % or less of oxygen; and
   the balance of atom % of SiC;
   wherein 75% or more of said scandium is dissolved, as solid solution, into the SiC grains.

2. A SiC sintered body according to claim 1, wherein 95% of said scandium is dissolved in said SiC.

3. A SiC sintered body according to claim 1, wherein said scandium present in no more than 1 atom %.

4. A SiC sintered body according to claim 1, further consisting of no more than 5 atom % nitrogen.

5. A SiC sintered body according to claim 4, wherein said nitrogen is present in an amount of no less than half the oxygen content thereof.

6. A SiC sintered body according to claim 1, wherein impurities Fe, Ca, Al and B, are present individually in an amount of no more than 0.25% atom %, and together amount to no more than 0.5 atom %.

7. A SiC sintered body according to claim 1, wherein said sintered body is made of grains having an aspect ratio of 5 or less and a maximum size of 50 μm or less.

* * * * *